United States Patent [19]

Nakagawa et al.

[11] 4,184,761

[45] Jan. 22, 1980

[54] EXPOSURE CONTROL DEVICE OF SHUTTER FOR CAMERA

[75] Inventors: Tadashi Nakagawa; Ichiro Nemoto, both of Yotsukaido, Japan

[73] Assignee: Seiko Koki Kabushiki Kaisha, Japan

[21] Appl. No.: 954,864

[22] Filed: Oct. 26, 1978

[30] Foreign Application Priority Data

Oct. 28, 1977 [JP] Japan .......................... 52-144631[U]

[51] Int. Cl.² .......................... G03B 17/38; G03B 9/64
[52] U.S. Cl. .................................... 354/267; 354/239
[58] Field of Search ................ 354/266, 267, 234–252

[56] References Cited

U.S. PATENT DOCUMENTS

| | | | |
|---|---|---|---|
| 3,825,940 | 7/1974 | Hayami | 354/251 X |
| 3,893,143 | 7/1975 | Taguchi et al. | 354/267 X |
| 3,945,026 | 3/1976 | Hayami | 354/239 X |
| 4,047,211 | 9/1977 | Inoue et al. | 354/266 X |
| 4,069,491 | 1/1978 | Scholz | 354/267 |

*Primary Examiner*—Donald A. Griffin

*Attorney, Agent, or Firm*—Robert E. Burns; Emmanuel J. Lobato; Bruce L. Adams

[57] ABSTRACT

An exposure control device for the shutter of a camera wherein an opening member opens the aperture of the shutter to start exposure, a closing member closes the aperture to complete exposure, an opening hook and a closing hook retain at a charged position the opening member and the closing member, respectively. A control member is released by shutter release operation to control the exposure time by shutter release operation to control the exposure time and to successively release said opening member and said closing member. A governor delays the motion of said control member in proportion to desired exposure times. An interlocking lever is adjustable to a first range where it is actuated by the movement of the control member to push the closing hook and to a second range where it is actuated by the movement of the opening member to push the closing hook. An adjusting lever supports the interlocking lever operable within the first and second ranges. A cam member changesover the adjusting lever in proportion to the desired exposure time.

3 Claims, 5 Drawing Figures

EXPOSURE CONTROL DEVICE OF SHUTTER FOR CAMERA

BACKGROUND OF THE INVENTION

This invention relates to an exposure control device for the shutter of a camera.

A portable camera, as its specific requirement, is preferable to be built still more compact. In the recent years, the manufacturing cost has been steadily rising. In order to compensate the rising cost and to provide low priced cameras to the users, it is essential to simplify the mechanism and to reduce the dimensions of cameras to produce small sized cameras. The conventional cameras may be reproduced in smaller sized cameras by reducing the dimension of every component parts, however, the reduction of dimension of the component parts requires higher machining accuracy to maintain the accurate performance of the mechanism and if the conventional mechanism is to be constructed of the conventional parts in reduced dimension, difficult assembling procedure will result due to narrow positions of the component parts relative to each other. These problems induce higher manufacturing cost and often cause failures in operation. Accordingly, the simple reduction of dimension of parts to provide small sized cameras is unfavourable to the users.

Accordingly, an object of the present invention is to provide a small sized camera at a low price by integrating the functions of various parts into a minimum number of constituent parts to reduce the number of parts and to contrive to eliminate odd space reducing the dimension of the construction so that the manufacturing cost and the assembling cost are reduced and the possibility of failure in performance is decreased.

The exposure control device of the shutter for the camera according to the present invention comprises, an opening member which opens the aperture of the shutter to start exposure; a closing member which closes said aperture to complete the exposure; an opening hook and a closing hook which retain at the charged position said opening member and said closing member, respectively; a control member released by shutter release operation to control the exposure time and to successively release said opening member and said closing member; a governor which delays the motion of said control member in proportion to desired exposure times; and interlocking lever adjustable to a first range where it is actuated by the movement of said control member to push said closing hook and to a second range where it is actuated by the movement of said opening member to push said closing hook; and adjusting lever which supports said interlocking lever operable within said first and second ranges; and a cam member which changesover said adjusting lever in proportion to desired exposure times.

Furthermore, said interlocking lever is supported by said adjusting lever between said closing hook and said control member and adjusted in the directions to approach said control member and said closing hook in the first and the second range, respectively. Still further, said interlocking lever is supported so as to be able to be pushed by said control member also within said second range. Thus the exposure control device being constructed of a system wherein the relative position of the interlocking lever constituting a part of the exposure control mechanism is changed corresponding to the desired exposure time eliminating the provision of any special member, therefore, the mechanism of the exposure time control device is simplified requiring narrower space.

Referring to the attached drawings, detailed explanation will be made on an embodiment of the present invention as follows.

Figure 1:
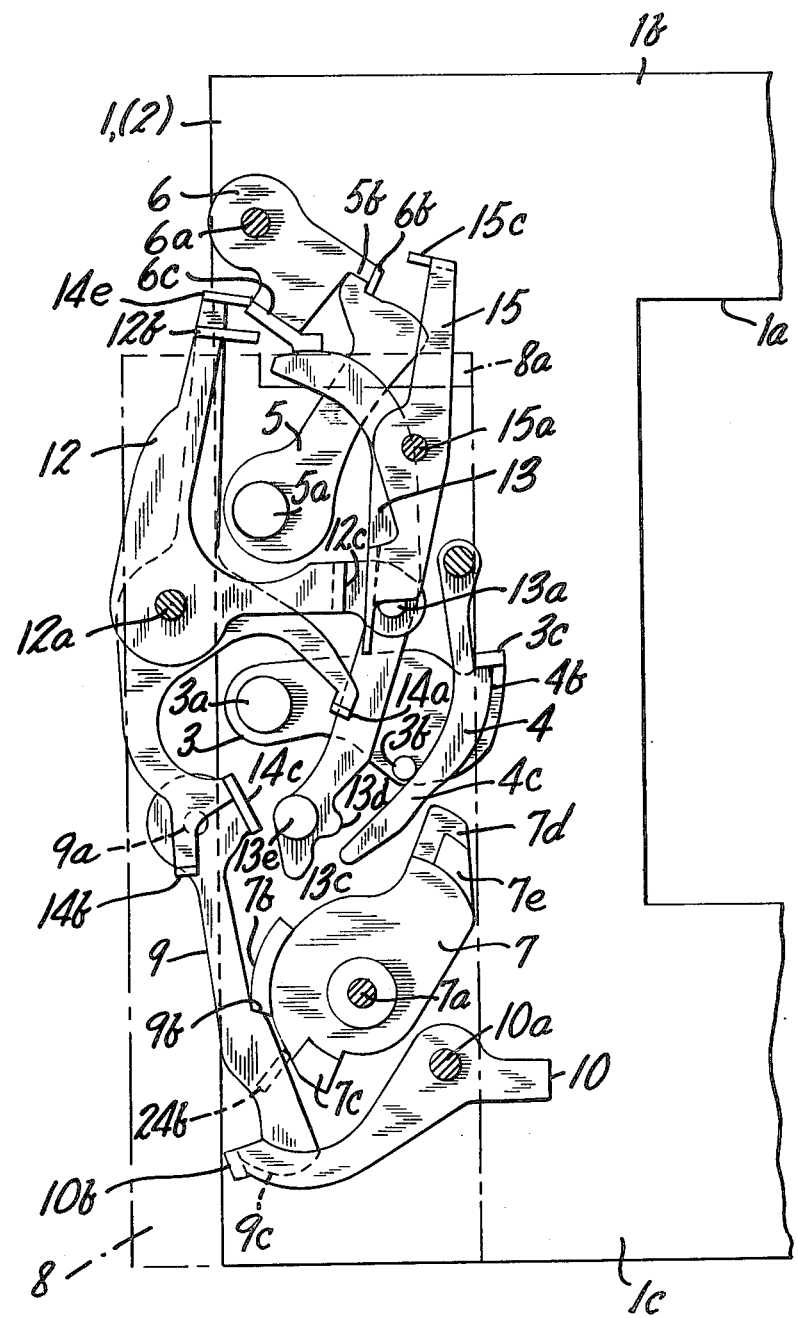
FIG. 1 is a plan view of main part of the device according to the present invention in charged state.

Referring first to FIG. 1, an aperture (1a) is formed on a base plate (1) and covered with an opening blade, not shown. A closing blade, not shown, is housed in the space (1b) above the aperture (1a) and prepared to complete the exposure. Each of said blades is supported operable within a parallel plane confined between the shutter base plate (1) and a receiving plate (2) shaped identical with and supported in parallel on the shutter base plate.

An opening member (3) is reciprocable about a pivot (3a) fastened to the base plate (1) and is urged clockwise by a spring, not shown. A pin (3b) is projecting upwards on the right lower part of the opening member (3). A raised part (3c) is projecting upwards at the right edge of the opening member (3). The opening member (3) is connected with an opening blade, not shown, by a known method so as to actuate the opening blade.

An opening hook (4) is reciprocable about a pivot (4a) fastened to the base plate (1) and is urged counter-clockwise by a spring, not shown. The opening hook (4) retains the opening member (3) at the charged position by the engagement of a hook portion (4b) with the raised part (3c). The opening hook (4) has an elongation (4c) extending downwards.

A closing member (5) is reciprocable about a pivot (5a) fastened to the base plate (1) and is urged clockwise by a spring, not shown. A hook portion (5b) is formed on the right edge of the closing member (5) and is connected with a closing blade, not shown, so as to actuate the closing blade by a known method.

A closing hook (6) is reciprocable about a pivot (6a) fastened to the base plate (1) and urged clockwise by a spring, not shown. The closing hook (6) has a raised part (6b) which is engaged with the hook portion (5b) to retain the closing member (5) at the charged position and an operating raised portion (6c).

A control member (7) is reciprocable about a pivot (7a) fastened to the base plate (1) and is urged counter-clockwise by a spring, not shown. The control member (7) has a stepped portion (7b) having an inclined outer surface, an upwardly projecting pushing portion (7c), a projection (7d) engaging with the elongation (4c) of the opening hook (4), and a pushing portion (7e) projecting above the projection (7d).

A control base plate (8) having a raised shelf portion (8a) perpendicularly intersecting the operating plane of abovementioned members, is fixed to the base plate (1) by a known method so as to cover abovementioned members. A part of the operating range of abovementioned and undermentioned members extends over the control base plate (8).

A control hook (9) is reciprocable about a pivot (9a) on the reverse side of the control base plate (8) and urged counterclockwise by a spring, not shown. The control hook (9) has an inclined face (9b) to retain the control member (7) at the charged position by the engagement with the stepped portion (7b) and a hook part (9c). A release lever (10) is reciprocable about a pivot (10a) fastened to the control base plate (8) and is urged counterclockwise by a spring, not shown. The release lever has a raised end (10b) to be engaged with the hook portion (9c) of the control hook (9), which raised end (10b) rests on a stopper piece, not shown, where the raised end (10b) is engaged with the hook portion (9c) of the control hook (9) to constrain the control member (7) at the charged position as illustrated in FIG. 1.

Figure 2:
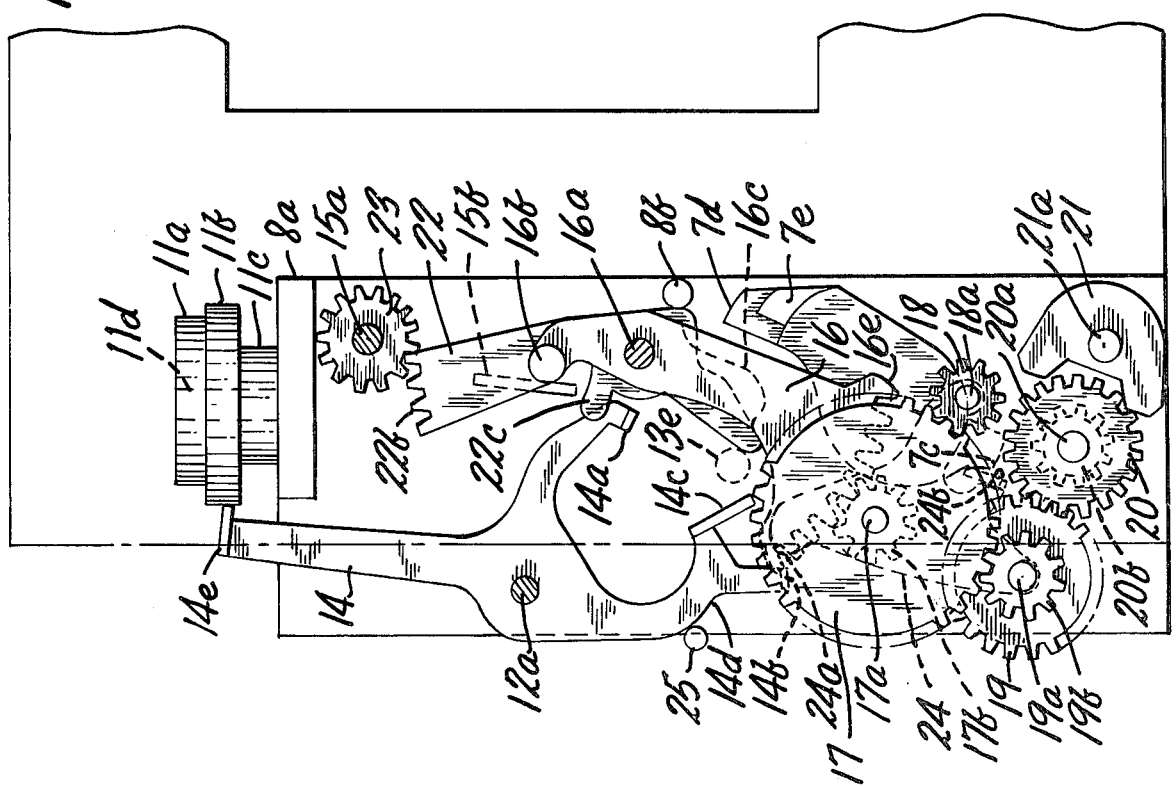
FIG. 2 is a plan view of the governor.

Cam members (11a), (11b) and (11c) arranged to changeover the shutter control mechanism interlocking with the exposure time selecting operation are mounted on the raised shelf portion (8a) of the control base plate (8) so as to rotate on a shaft (11d), (FIG. 2).

An adjusting lever (12) having a raised portion (12b) touching the cam member (11c) and an arm portion (12c) extending to the right is reciprocable about a pivot (12a) fastened to the control base plate (8) and is urged clockwise by a spring, not shown. The tip of the arm (12c) is bent downwards and is adapted to hold an interlocking lever (13) on the reverse side of the control base plate (8) so as to reciprocate about a pivot (13a).

Figure 3:
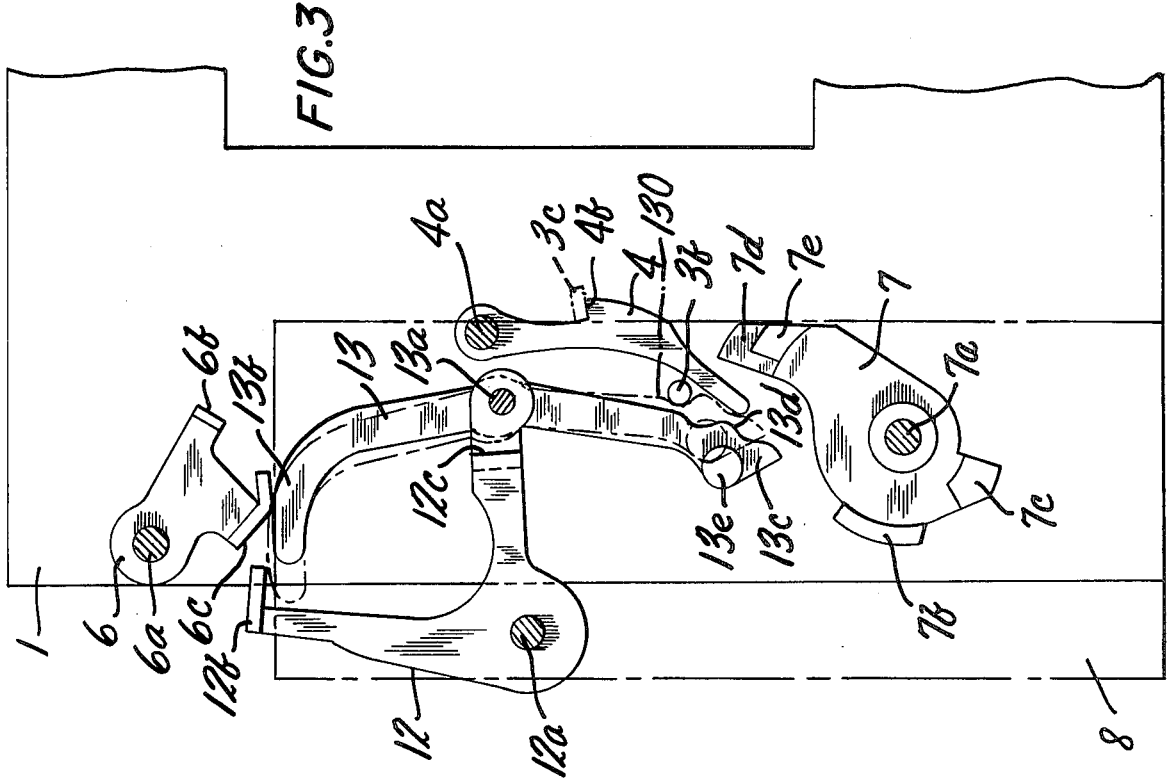
FIGS. 3, 4 and 5 are explanatory views of the functional units, wherein, the numerals designate; 3: opening member, 4: opening hook, 5: closing member, 6: closing hook, 7: control member, 10: release lever, 11: cam member, 12: adjusting member, 13: interlocking lever, 14: changeover member and 16-23: governor.

The interlocking lever (13) has a first arm (13b) related with the operating raised portion (6c) of the closing hook (6), a second arm (13c) and a protrusion (13d) related with the pin (3b) of the opening member (3) and a pin (13e) related with the projection (7d) of the control member (7), (FIG. 3).

The interlocking lever (13) being disposed below the opening hook (4). The second arm (13c) and the elongation (4c) move without interfering with each other.

A changeover member (14), having a first arm (14a) with its tip raised, a second arm (14d) having two raised portion (14b) and (14c) and a third arm (14e) having a raised portion which is related with a cam member (11b), is reciprocable about a pivot (12a) fasened to the control base plate (8).

Figure 5:
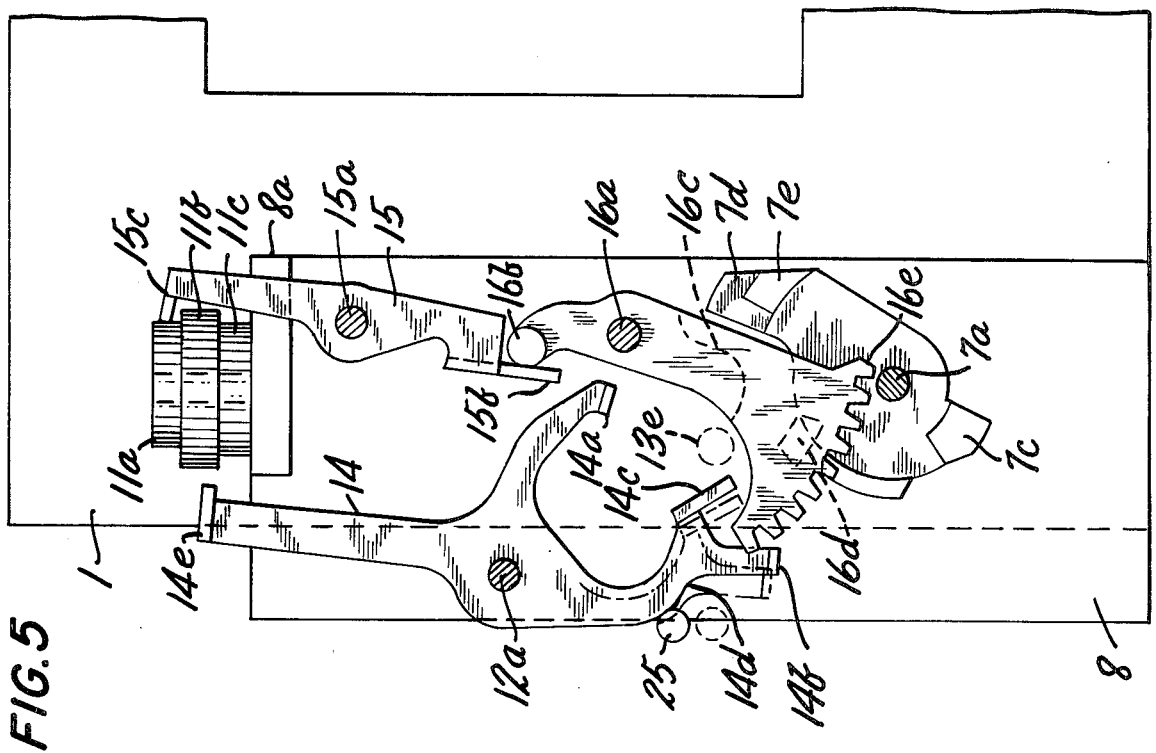

An operating lever (15), having a lower raised end (15b) and a raised end (15c) related with the cam member (11a), is reciprocable about a pivot (15a) fastened to the control base plate (8), (FIG. 5).

A governor is composed of a first sector gear (16), a second wheel (17), an intermediate wheel (18), a third wheel (19), an escape wheel (20) and an anchor (21). A second governor is composed of an auxiliary sector gear (22) and a pinion (23).

The first sector gear (16) is rotatable on a shaft (16a) fastened to the control base plate (8). The first sector gear (16) is formed of a projection (16b) touching the lower raised end (15b) of the operating lever (15), a cam part (16c) formed on the reverse face of the first sector gear (16) and related with the pushing portion (7e) of the control member (7), a downward projection (16d) and gear teeth (16e) at the lower end and is urged by a spring, not shown, in the direction that the projection (16b) is pressed against the raised end (15b).

The second wheel (17) having gear teeth on the periphery is combined with a pinion (17b) engaging with the sector gear (16e) and is turnable about a pivot (17a) fastened on the control base plate (8). The second wheel (17) is engaged with the intermediate wheel (18) and a pinion (19b) formed in combination with the third wheel (19).

The intermediate wheel (18) and the third wheel (19) are rotatably mounted on an intermediate lever (24) about pivots (18a) and (19a), respectively.

The intermediate lever (24), having a projection (24a) related with the raised portion (14b) of the changeover member (14) and a raised portion (24b) related with the pushing portion (7c) of the control member (7) and urged counterclockwise by a spring, not shown, is reciprocable below the second wheel (17) about the pivot (17a) fastened to the control base plate (8).

The escape wheel (29) is rotatable on a shaft (20a) fastened on the control base plate (8) and the teeth provided on the periphery of which is engageable with the intermediate wheel (18) and is normally engaged with the anchor (21). A pinion (20b) provided on the back of the escape wheel (20) is engageable with the peripheral teeth of the third wheel (19). In the charged state, as illustrate, the third wheel (19) and the intermediate wheel (18) are not engaged with the pinion (20b) and the escape wheel (20), respectively.

The anchor (21) is reciprocable about a pivot (21a) fastened to the control base plate (8). The relative interaction is well known, therefore, the explanation will be omitted. (FIG. 2)

Figure 4:
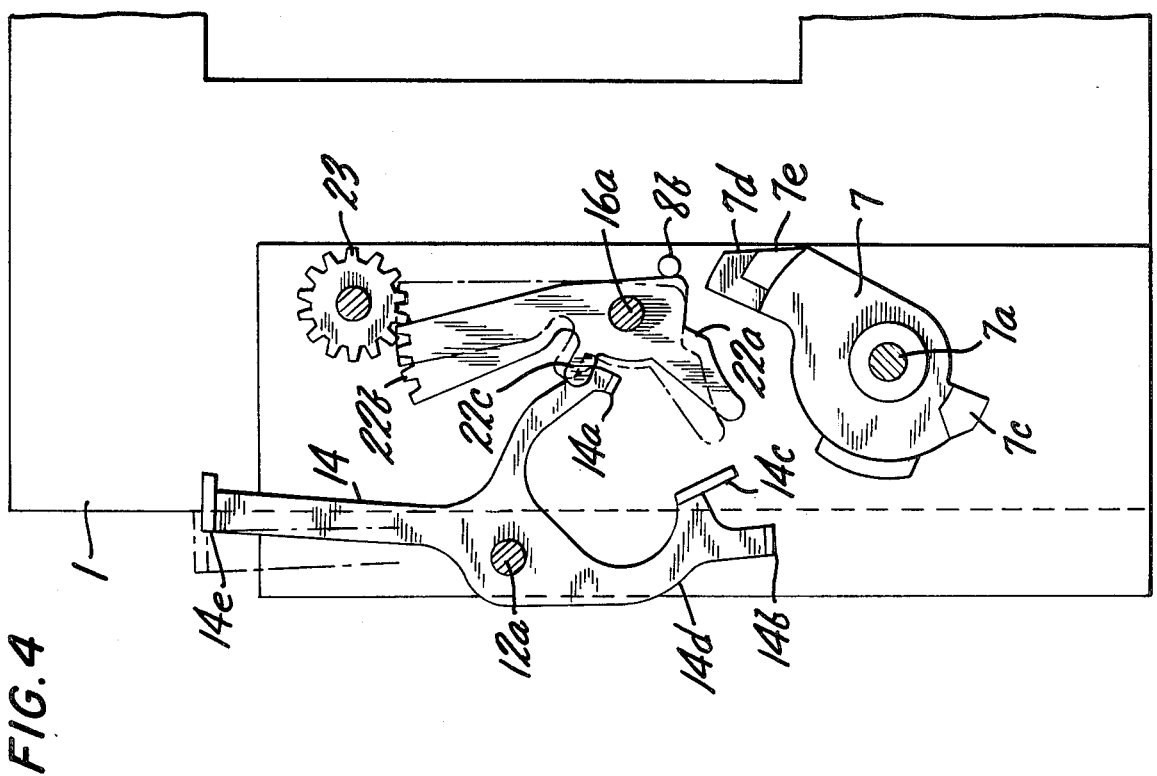

The auxiliary sector gear (22) is reciprocable about the pivot (16a) below the first wheel (16) and is resting on a projection (8b) of the control base plate (8) urged counterclockwise by a spring, not shown. The auxiliary sector gear (22) has a pushing arm (22a) related with the projection (7d) of the control member (7), gear teeth (22b) on the upper end and a protrusion (22c) related with the first arm (14a) of the changeover member (14). (FIG. 4)

The pinion (23) is rotatable below the operating lever (15) on the pivot (15a) fastened to the control base plate (8) and is engaged with the gear teeth (22b) of the auxiliary sector gear (22).

A pin (25) is related with the second arm (14d) of the changeover member (14) and functions to cancel the bulb exposure setting interlocking with the operation of the release motion. The illustration shows the shutter in the charged state adjusted to one second of exposure time.

The performance of the shutter following the release operation will be explained hereinafter.

Starting from the charged state as shown in FIG. 1, the release lever (10) is turned clockwise about the pivot (10a) against the spring force provided by a spring, not shown, interlocking with the shutter release operation to disengage the hook portion (9c) from the retention of the raised end (10b) so that the control hook (9) is turned clockwise about the pivot (9a) against the spring force provided by a spring, not shown, pushed by the stepped portion (7b) of the control member (7) at the inclined face (9b).

The control member (7) starts turning counterclockwise about the pivot (7a) pulled by a spring, not shown, and cancels the pressing of the pushing portion (7c) to the raised portion (24b) of the intermediate lever (24) so that the intermediate lever (24) turns counterclockwise about the pivot (17a) pulled by a spring, not shown, as far as it is stopped by a known stopper, not shown, where the third wheel (19) is engaged normally with the pinion (20b) combined with the escape wheel (20).

As the control member (7) turns successively, the projection (7d) pushes the elongation (4c) of the opening hook (4) to turn the opening hook (4) about the pivot (4a) clockwise against the spring force provided by a spring, not shown, until the raised part (3c) is disengaged from the hook portion (4b).

When the constraint of the opening member at the raised portion (3cP is cancelled, the opening member (3) turns clockwise about the pivot (3a) pulled by a spring, not shown, and actuates the opening blade, not shown, to open the aperture starting the exposure. In the state as shown in FIG. 1, the pin (3b) will not be engaged with neither the protrusion (13d) or the second arm (13c) of the interlocking lever (13).

As the control member (7) turns counterclockwise further, the projection (7d) comes into engagement with the pushing arm (22a) of the auxiliary sector gear (22) and turns the auxiliary sector gear (22) clockwise about the pivot (16a) against the spring force provided by a spring, not shown, so that the pinion (23) is driven by the gear teeth (22b), while the pushing arm (7e) turns the first wheel (16) clockwise about the pivot (16a) against the spring force provided by a spring, not shown, engaging with the cam portion (16c) so that the escape wheel (20) is driven through the gear train comprising the pinion (17b), the second wheel (17), the pinion (19d), the third wheel (19) and the pinion (20b), consequently, the anchor (21) is reciprocated.

When the exposure time of one second passed, the pushing portion (7e) leaves the working range on the cam portion (16c) and turns counterclockwise in a quick motion so that the projection (17d) comes into engagement with the pin (13e) in a moment and turns clockwise the interlocking lever (13) about the pivot (13a).

As the interlocking lever (13) is pushed at the pin (13e), the first arm (13b) pushes the operating raised portion (6c) of the closing hook (6) to turn the closing hook (6) counterclockwise about the pivot (6a) against the spring force provided by a spring, not shown, so that the retention of the hook portion (5b) of the closing member (5) with the raised portion (6b) is cancelled. At this state, the control member (7) hits and rests on a stopper, not shown.

When the closing member (5) is released, it turns clockwise about the pivot (5a) pulled by a spring, not shown, and actuates the closing blade, not shown, to close the aperture (1a) so that the exposure is completed. Thus, one exposure is completed by a series of operations as explained above.

In recharging the shutter, the control member (7) is turned clockwise about the pivot (7a) by a known method, not shown, against the spring force of a spring, not shown, to cancel the pressing of the pushing portion (7e) and the projection (7d) on the cam portion (16c) of the first wheel (16), and the pushing arm (22a) of the auxiliary sector gear (22) and the pin (13e) of the interlocking lever (13), respectively, then, as the control member (7) is turned further, the pressing on the elongation (4c) of the opening hook (4) is cancelled, the pushing portion (7c) pushes the intermediate lever (24) at the raised portion (24b) to disengage the third wheel (19) from the pinion (20b), and finally, the control member (7) is retained at the charged position by the engagement of the inclined face (9b) of the control hook (9) with the stepped portion (7b), while the control hook (9) is retained at the position by the engagement of the hook portion (9c) with the raised portion (10b) of the release lever (10).

The opening member (3) and the closing member (5) are turned counterclockwise about the pivots (3a) and (5a), respectively, by a known method, not shown, against the spring force provided by springs, not shown, simultaneously with the clockwise rotation of the control member (7) to put the opening blade and the closing blade, not shown, back in their charged positions while covering the aperture (1a) all the time and to retain the raised portion (3c) and the hook poortion (5b) with the hook portion (4b) of the opening hook (4) and the raised portion (6b) of the closing hook (6), respectively, thus, the exposure control device is recharged as illustrated in the drawings.

In adjusting the exposure time to ½ or ¼ seconds, the cam members (11a), (11b) and (11c) control the operating lever (15) to turn counterclockwise about the pivot (15a) pulled by a spring, not shown, so that the raised portion (15b) pushes the projection (16b) of the first wheel (16) to turn the first wheel (16) clockwise about the pivot (16a) reducing the working range of the pushing portion (7e) of the control member (7) on the cam portion (16c) in proportion to the required exposure time.

In adjusting the exposure time to ⅛, 1/16 or 1/30 seconds, the operating angle of the first wheel (16) relative to the control member (7) is adjusted by the cam members (11a), (11b) and (11c) through the operating lever (15) and at the same time, the intermediate lever (24) is turned clockwise about the pivot (17a) against the spring force provided by a spring, not shown, pushed by the raised portion (14b) of the changeover member (14) at the projection (24a), so that the third wheel (19) is disengaged from the escape wheel (20) while the intermediate wheel (18) is engaged with the escape wheel (20).

The intermediate wheel (18) merely transmits the rotation of the second wheel (17) to the escape wheel (20) without changing the ratio of rotation, therefore, the braking effect of the anchor (21) becomes smaller as compared with the effect in the case described immediately above.

Accordingly, the shutter is controlled to provide a desired exposure time.

In adjusting the exposure time to 1/60 seconds, the first wheel (16) is adjusted by the cam members (11a), (11b) and (11c) in the same manner as in the abovementioned case, and at the same time, the intermediate lever (24) is adjusted by the changeover member (14) to the position where neither the third wheel (19) nor the intermediate wheel (18) is not engaged with the escape wheel (20).

In this state, the desired exposure time is controlled without the least braking effect of the anchor (21).

The operation of the shutter for the respective exposure time mentioned above being quite identical with the operation of the shutter for the exposure time of one second, explanation will be omitted to avoid duplication.

In adjusting the exposure time to 1/125 seconds, the first wheel (16) is adjusted to the maximum operating position by the cam members (11a), (11b) and (11c), and the intermediate lever (24) is adjusted to the position where neither the third wheel (19) nor the intermediate wheel (18) is engaged with the escape wheel (20), and at the same time, the adjusting lever (12) is pushed at the raised portion (12b) to turn counterclockwise about the pivot (12a) against the spring force provided by a spring, not shown, and to adjust the interlocking lever

(13) pivoted on the arm (12c) at the right end of the adjusting lever (12) in the direction that the first arm (13b) approaches the closing hook (6) as illustrated in FIG. 3.

In this state, the second arm (13c) of the interlocking lever (13) is disposed adjacent to the pin (3b) of the opening member (3).

In operation, the control member (7) is released in the same procedure as in the case of the exposure time of one second, then after the opening member (3) is released by the motion of the opening hook (4) urged by the projection (7d), the motion of the control member (7) is delayed by the first wheel (16), while the opening member (3) turns clockwise about the pivot (3a) starting the exposure and at the final stage of its operation, the pin (3b) pushes the interlocking lever at the second arm (13c) turning the interlocking lever clockwise about the pivot (13a) so that the closing hook (6) is turned counterclockwise about the pivot (6a) releasing the closing member (5) to complete the exposute.

In the case of exposure time of 1/250 seconds, the interlocking lever (13) is adjusted so as the first arm (13b) approaches the closing hook (6) closer compared with the case of 1/125 seconds, consequently, the protrusion (13d) approaches the pin (3b) as illustrated by alternate long and short dash lines in FIG. 3. (refer to the position indicated by the reference numeral 130).

In this state, when the shutter is released, the opening member (3) is actuated to start the exposure in the same procedure as in the case of 1/125 seconds. At the initial stage of the operation of the opening member (3), the pin (3b) pushes the interlocking lever (13) at the protrusion (13d) to turn the interlocking lever (13) clockwise about the pivot (13a) so that the first arm (13b) pushes the closing hook (6) to release the closing member (5), thus the exposure is completed.

In the case of 1/125 and 1/250 seconds, abovementioned exposure operation is performed and the exposure is completed while the motion of the control member (7) is being delayed by the engagement of the projection (7d) with the first wheel (16). Although the control member (7) reaches the position where the projection (7d) pushes the pin (13e) after a delayed time controlled by the first wheel (16), the control member (7) finishes its motion without engaging with the pin (13e) as the interlocking lever (13) has been pushed by the pin (3b) as far as the final position.

In the case of exposure time of 1/500 seconds, the adjusting lever (12) and the changeover member (14) are adjusted to the same position with the case of 1/125 seconds by the cam members (11a), (11b) and (11c) and the operating lever (15) is adjusted to the position where the first wheel (16) acts on the control member (7) in the latter period of the operation of the control member (7).

In this state, the auxiliary sector gear (22) is resting on the projection (8b) of the control base plate (8) as the projection (22c) of the auxiliary sector gear (22) is not constrained by the first arm (14a) of the changeover member (14). (FIG. 4)

In operation, the control member (7) is released and the opening member (3) is actuated to start the exposure in the same procedure as described above. At the same time, the pushing portion (7e) of the control member (7) engages with the pushing arm (22a) of the auxiliary sector gear (22) to turn the auxiliary sector gear (22) clockwise about the pivot (16a) against the spring force provided by a spring, not shown. The motion of the control member (7) is delayed by the resistance of rotation of the pinion (23) with the gear teeth (22b).

The auxiliary sector wheel (22) contributes only a little to the delaying effect. The projection (7d) starts pushing the pin (13e) and the interlocking lever (13) is turned clockwise about the pivot (13a) before the pin (3b) of the opening member (3) pushes the second arm (13c) and the first arm (13b) actuates the closing hook (6) to release the closing member (5) and completes the exposure.

The control member (7) turns counterclockwise further while its motion is delayed and the turning speed is reduced by the engagement of the pushing portion (7e) with the cam portion (16c) of the first wheel (16) and finally stops turning.

Although the auxiliary sector gear (22) contributes to delaying the motion of the control member (7) in the cases of the aforesaid exposure times, explanation on the delaying effect of the auxiliary sector gear (22) in the aforesaid cases has been omitted to simplify the explanation as its delaying effect is insignificant.

In the case of exposure time of 1/1000 seconds, the first wheel (16) is adjusted to the position same as in the case of exposure time of 1/500 seconds by the cam members (11a), (11b) and (11c). The adjusting lever (12) is adjusted to the position same as in the case of exposure time of 1/250 seconds (as illustrated by alternate long and short dash lines and indicated by a reference numeral 130 in FIG. 3). The changeover member (14) is adjusted to the position same as in the case of exposure time of $\frac{1}{8}$ seconds (as illustrated by alternate long and short dash lines in FIG. 4). The first arm (14a) acts on the projection (22c) of the auxilisry sector wheel (22) and turns the auxiliary sector wheel (22) clockwise about the pivot (16a) as far as the position shown by alternate long and short dash lines in FIG. 4. Consequently, the delaying effect of the auxiliary sector wheel (22) is reduced as the pushing arm (22a) becomes far off the projection (7d).

In this state, when the shutter is released, the members operate in the same procedure as in the case of exposure time of 1/500 seconds, however, the exposure time of 1/1000 seconds is controlled because the delaying effect of the auxiliary sector wheel (22) on the control member (7) is less. And in this case also, the interlocking lever (13) is actuated pushed by the projection (7d) at the pin (13e) before the pin (3b) pushes at the protrusion (13d), therefore, the shorter exposure time is controlled.

In the case of bulb exposure, the exposure operation starts from the charged state for the exposure time of one second as illustrated. The changeover member (14) turns clockwise about the pivot (12a) pulled by a spring, not shown, when the retention of the member at the raised portion (14e) with the cam members (11a), (11b) and (11c) is cancelled. The second arm (14d) hits on the pin (25) of the bulb cancellation member so that the changeover member (14) is allowed to turn as far as the position as shown by alternate long and short dash lines in FIG. 5.

In operation, interlocking with the depression of the shutter release button of the camera, the pin (25) of the bulb cancellation member leaves the second arm (14d) of the changeover member (14) and retracts to the position as shown by broken lines in FIG. 5 allowing the changeover member (14) to turn pulled by a spring, not shown, to the position as shown by alternate long and short dash lines in FIG. 5 so that the raised portion (14c)

enters into the locus of the projection (16d) of the first wheel (16), then the release lever is turned clockwise. The following operation is identical with the case of the exposure time of one second; the control member (7) actuates the opening member (3), the first wheel (16) is turned clockwise and the motion of the control member (7) is delayed. The projection (16d) is turned about the pivot (16a) and when the projection (16d) hits against the raised portion (14c) of the changeover member (14), the rotation of the control member (7) is intercepted so that the shutter remains opened.

When the depression of the shutter release button is cancelled, the pin (25) returns to the initial position pushing the changeover member (14) at the second arm (14d) to turn counterclockwise about the pivot (12a) retracting the raised portion (14c) from the locus of the projection (16d) of the first wheel (16) so that the first wheel (16) starts turning clockwise again releasing the retention of the control member (7). Consequently, the control member (7) pushes the pin (13e) with the projection (7d) and completes the exposure as in aforesaid cases, then finishes up its operation.

In the embodiment described above, the interlocking lever (13) is adjusted to different positions in the second range for 1/500 and 1/1000 seconds, further the delaying of the auxiliary sector gear (22) also is adjusted according to the exposure time, however, it may be arranged that the desired exposure time is controlled by adjusting only the delaying time of the auxiliary sector gear (22) while the interlocking lever (13) is adjusted to one position in the second range for either exposure time, or that the desired exposure time is controlled only by adjusting the interlocking lever (13) without adjusting the delaying action of the auxiliary sector gear (22) by the first arm (14a), or the exposure times of 1/1000, 1/500 and 1/60-1 second may be controlled by the combined effect of the first and second governors in the first range.

It may be well understood from the explanations made above that the exposure time controlling device according to the present invention is simply constructed and reduced of number of constituent parts, therefore, requires narrow space the performance is stable as the interlocking lever (13), one of the elements composing the device, is commonly used by being changed over corresponding to the required exposure time and no other parts for changeover is required. Accordingly, the dimension of the device is reduced, besides, the diminution of number of the constituent parts contributes to the reduction of the manufacturing cost, assembling cost and the possibility of faulty performance and provides a small sized and low priced shutter which is essential to this sort of shutters.

We claim:

1. An exposure control device for the shutter of a camera comprising, an opening member which opens the aperture of the shutter to start exposure; a closing member which closes said aperture to complete the exposure; an opening hook and a closing hook which retain at a charged position said opening member and said closing member, respectively; a control member released by shutter release operation to control the exposure time and to successively release said opening member and said closing member; a governor which delays the motion of said control member in proportion to desired exposure times; an interlocking lever adjustable to a first range where it is actuated by the movement of said control member to push said closing hook and to a second range where it is actuated by the movement of said opening member to push said closing hook; an adjusting lever which supports said interlocking lever operable within said first and second ranges; and a cam member which changesover said adjusting lever in proportion to desired exposure times.

2. An exposure control device of the shutter for the camera as set forth in claim 1, wherein said interlocking lever is supported by said adjusting lever between said closing hook and said control member and adjusted in the directions to approach said control member and said closing hook in the first and the second range, respectively.

3. An exposure control device of the shutter for the camera as set forth in claim 1, wherein said interlocking lever is supported so as to be able to be pushed by said control member also within said second range.

* * * * *